(12) United States Patent
Ziola (10) Patent No.: US 9,340,165 B2
(45) Date of Patent: May 17, 2016

(54) COLLAPSIBLE BICYCLE RACK WITH AN EXTENSION SET

(71) Applicant: I-Racks GmbH, Wolpertswende (DE)

(72) Inventor: Stefan Ziola, Wolpertswende (DE)

( * ) Notice: Subject to any disclaimer, the term of this patent is extended or adjusted under 35 U.S.C. 154(b) by 79 days.

(21) Appl. No.: 14/389,830

(22) PCT Filed: Mar. 21, 2013

(86) PCT No.: PCT/EP2013/055910
§ 371 (c)(1),
(2) Date: Dec. 4, 2014

(87) PCT Pub. No.: WO2013/160034
PCT Pub. Date: Oct. 31, 2013

(65) Prior Publication Data
US 2015/0115010 A1    Apr. 30, 2015

(30) Foreign Application Priority Data

Apr. 26, 2012   (DE) .......................... 10 2012 103 697

(51) Int. Cl.
*B60R 9/10*    (2006.01)
*B60R 9/06*    (2006.01)

(52) U.S. Cl.
CPC .... *B60R 9/10* (2013.01); *B60R 9/06* (2013.01)

(58) Field of Classification Search
CPC .......................................................... B60R 9/10
See application file for complete search history.

(56) References Cited

U.S. PATENT DOCUMENTS

| | | | | |
|---|---|---|---|---|
| 8,418,902 B2 * | 4/2013 | Cha ........................... | B60R 9/10 | 224/488 |
| 8,827,128 B2 * | 9/2014 | Degenstein ............... | B60R 9/06 | 224/496 |
| 9,120,429 B2 * | 9/2015 | Lungershausen ......... | B60R 9/10 | |
| 9,174,584 B1 * | 11/2015 | Cha ........................... | B60R 9/10 | |

FOREIGN PATENT DOCUMENTS

| | | |
|---|---|---|
| DE | 69905676 T2 | 3/2004 |
| DE | 102007017164 A1 | 10/2008 |

(Continued)

*Primary Examiner* — Justin Larson
(74) *Attorney, Agent, or Firm* — David A. Guerra (57) ABSTRACT

The invention relates to a foldable bicycle carrier (1) which serves for the transport of one or several bicycles, with an extension set (11), in which the bicycle carrier (1) presents bicycle-carrier-fixed positioning areas (8) for running wheels of the bicycles, and each time two positioning areas (8a 8b, 8b or 8c, 8d) are assigned to a bicycle, wherein the positioning areas (8) of the bicycle carrier (1) for folding are pivotable around at least one pivoting axis (ST), and the extension set (11) is detachably applied at the bicycle carrier (1) and presents a first positioning area (18a) and a second positioning area (18b) separated from the first positioning area (18a), which are assigned to the running wheels of a further bicycle, and the two parts of the extension set (11) comprising the positioning areas (18a; 18b) are applied at the collapsible area of the bicycle carrier (1) detachably and pivotably forwards and backwards in direction of the bicycle-carrier-fixed positioning areas (8), in which the bicycle carrier (1) is collapsible together with the mounted, pivoted forwards extension set (11), wherein the pivotable bearing of the two parts of the extension set (11) each time presents a first bearing place (L1) and a second bearing place (L2), in which an element pivotably supported in both bearings (L1, L2) depending on relative position makes possible tensioning the corresponding part of the extension set (11) with the bicycle carrier (1) in the pivoted forwards position, as well as tensioning the corresponding part of the extension set (11) with the bicycle carrier (1) in the pivoted back position as well as a pivoting the corresponding part of the extension set (11) as to the load carrier (1), the bearings (L1, L2) being off-center towards each other.

14 Claims, 10 Drawing Sheets

(56) References Cited

FOREIGN PATENT DOCUMENTS

| | | |
|---|---|---|
| DE | 102007039196 A1 | 1/2009 |
| DE | 102010036898 A1 | 2/2012 |
| DE | 102011108659 B3 | 11/2012 |
| DE | EP 2765032 A1 * | 8/2014 ............... B60R 9/06 |
| FR | 2829082 A1 | 3/2003 |

* cited by examiner

COLLAPSIBLE BICYCLE RACK WITH AN EXTENSION SET

CROSS-REFERENCE TO RELATED APPLICATIONS

This application is an U.S. national phase application under 35 U.S.C. §371 based upon co-pending International Application No. PCT/EP2013/055910 filed on Mar. 21, 2013. Additionally, this U.S. national phase application claims the benefit of priority of co-pending International Application No. PCT/EP2013/055910 filed on Mar. 21, 2013 and German Application No. 10 2012 103 697.7 filed on Apr. 26, 2012. The entire disclosures of the prior applications are incorporated herein by reference. The international application was published on Oct. 31, 2013 under Publication No. WO 2013/160034 A1.

BACKGROUND OF THE INVENTION

1. Field of the Invention

The invention relates to a foldable bicycle carrier, especially a rear-mounted carrier, with extension set.

2. Description of the Prior Art

Extension sets for foldable bicycle carriers are known, composed of several parts and attachable at the bicycle carrier, in order to allow the transport of a further bicycle. The disadvantage of these bicycle carriers is that they have to be dismounted each time from the bicycle carrier, in order to maintain the original folded product size of the bicycle carrier when folded, i.e. Lmax×Bmax×Hmax, in which Lmax is the maximum length, Bmax the maximum width and Hmax the maximum height, or the folded product size enlarges in at least one direction, as a rule however in several directions.

The DE 10 2007 017 164 A1 discloses a load carrier for the extraction out of a vehicle tail, in which a frame on at least one longitudinally movable element equipped with a pivoting axis is led through the bumper of a motor vehicle or under the bumper of the motor vehicle. The longitudinally movable element can be formed by two carriers fixed to each other, on which laterally two lateral wing-like positioning areas are arranged folding out by 180° pivotably. On the wing-like positioning areas in the rear each time another wing-like rear positioning area is applied pivotably by 180°. When folded, the back positioning area is within the lateral positioning areas that are arranged for their part superposed between the two carriers.

From DE 10 2011 108 659 A1 published later a foldable bicycle carrier with at least one positioning area is known, on which load to be transported, especially at least one bicycle, can be placed, and with a coupling mechanism which can be detachably attached at a trailer hitch with a substantially spherical head. The bicycle carrier is attachable on the trailer hitch in a stabilized way, afterwards a tensioning clamp can be pivoted over the head of the trailer hitch and be fixed by tensioning a clamp.

The swinging-in and tensioning of the clamp is done by a swinging movement around a pivoting axis of a single lever serving as control element, in which the lever serving as control element at the same time also carries or forms the positioning area. By use moreover a bicycle carrier is known which is usable in the basic form for two bicycles, in which starting from a large base each time positioning areas for the arms forming running wheels are provided, that can be folded out in case of use as bicycle carrier. For these bicycle carriers an extension set for another bicycle is provided that is applied directly on the base. Like the bicycle carrier this extension set has two arms, which form positioning areas for the running wheels of the additional bicycle.

These arms can be folded back individually and independently of the arms of the bicycle carrier. The object of the invention is to make available an extension set for a bicycle carrier, in particular the extension set is to allow that several bicycles can be transported. The handling is to be as simple and flexible as possible.

SUMMARY OF THE INVENTION

This task is resolved according to the invention by a bicycle carrier with extension set with the characteristics of claim 1. Advantageous embodiments are object of the sub-claims.

According to the invention the extension set is applied at the collapsible area of the bicycle carrier so that the bicycle carrier is collapsible together with the extension set, i.e. the bicycle carrier can be folded in a conventional way and at the same time also the extension set, which is applied at the bicycle carrier, is closed. Unlike the known bicycle carrier with extension set, no separated operation is necessary for folding. The extension set is not applied at a central carrier of the bicycle carrier, but directly at the carrier arms that form or carry the positioning areas, which entails weight benefits.

The extension set is multipart, the first and the second positioning area of the extension set each being assigned to another part. The parts of the extension set in an intermediate step for folding the bicycle carrier with extension set are placed between the corresponding two positioning areas of the bicycle carrier. This makes possible a folded product size which is not different, or not essentially different, from the folded product size of the bicycle carrier without extension set. By skilful flapping by first flapping or swinging back the extension set towards the bicycle carrier and afterwards folding the bicycle carrier together with the extension set a clearly reduced folded product size can be reached (i. e. Lmax× Bmax×Hmax, in which Lmax is the maximum length, Bmax the maximum width and Hmax the maximum height). In an ideal situation a folding is possible which does not enlarge at all the original folded product size of the bicycle carrier without extension set.

Especially preferably after the intermediate step of the back flap of the two positioning areas of the extension set the positioning areas of the bicycle carrier can still be used without restrictions. This makes possible a shorter length of the bicycle carrier together with the extension set, especially a length corresponding to the normal bicycle carrier, in the use with one or two bicycles. Especially the supplementary set of the bicycle carrier can remain at the bicycle carrier without impairment of usability.

The pivotable bearing of the two parts of the extension set preferably presents each time a common element pivotable supported in bearings, which makes possible a tightening against the load carrier when pivoted forwards and when pivoted back, in which the pivotably supported element, besides the bearing, for the part of the extension set has a second bearing arranged off-centre with respect to this first bearing, by means of which the element is supported on the bicycle carrier. The pivotable supported element is preferably a bolt with bearing places for the first bearing arranged off-centre in relation to the longitudinal axis of the bolt, by means of which the bolt is connected with the bicycle carrier, and the second bearing, by means of which the bolt is connected with the part of the extension set comprising the first or second positioning area, in which preferably the second bearing is two-piece and arranged on both sides of the first bearing. By swinging the bolt the tightening of the corresponding part of the extension set with the load carrier can be loosened, and the corresponding part of the extension set in the bearing place of the second bearing can be swung around the bolt.

Instead of this tightening however any type of other fixing in the final positions is possible. Preferably a holder is detachably applied at the support bracket, which may form a supplementary part of the extension set.

Particularly preferably the holder does not increase the folded product size or not essentially. Preferably the bicycle carrier has a coupling mechanism, with which it can be detachably attached at a trailer hitch with a substantially spherical head, in which the bicycle carrier can be placed on the trailer hitch in a stabilized way, afterwards a tensioning clamp can be pivoted over the head of the trailer hitch and can be fixed by tensioning a clamp. Especially preferably the swinging-in and tensioning of the clamp is done by a swinging movement of a single lever serving as control element around a lever arm pivoting axis, in which the lever serving as control element at the same time also forms or carries at least one positioning area of the bicycle carrier. Especially preferably the use for folding does not change with mounted extension set. Although in the following as bicycle carrier so-called rear-mounted carriers are referred to, in case of special vehicles the trailer hitch can also be at another side of the vehicle, for example at the front side.

Of course the bicycle carrier according to the invention can also be used for this purpose.

Moreover such an extension set is not limited to bicycle carriers that can be applied at traction couplings with a spherical head, but can be used without changes also for accordingly collapsible bicycle carriers that are applied at vehicles in another way.

BRIEF DESCRIPTION OF THE DRAWINGS

In the following the invention will be explained more in detail on the basis of an embodiment with reference to the included drawing. The figures show.

DETAILED DESCRIPTION OF THE INVENTION

The following description is based on a bicycle carrier 1 applied as rear-mounted carrier at a trailer hitch, as disclosed in DE 10 2011 108 659 A1 published later. This bicycle carrier 1 is illustrated in the figures with dashed lines. The directions refer to the normal travel direction of the vehicle, in which X is the direction contrary to the travel direction, Y the transversal direction and Z the vertical direction, and the bicycle carrier 1 is applied at the trailer hitch as a rear-mounted carrier.

The bicycle carrier 1 is to be fastened with the help of a coupling mechanism 2 at a not represented trailer hitch of a motor vehicle in the way described in said document. The bicycle carrier 1 has a central carrier 4, which in case of a bicycle carrier 1 applied correctly at a motor vehicle as rear-mounted carrier extends in longitudinal direction of the vehicle and in cross-section substantially presents the form of a closed hollow profile. At one end of the central carrier 4 the coupling mechanism 2 is arranged, at the other end of the central carrier 4 there is the collapsible part of the bicycle carrier 1 that forms the actual charge area. For this purpose two carrier arms 5 are applied by means of consoles 6 in this case eccentrically with respect to the central longitudinal axis of the central carrier 4 pivotably around carrier arm pivoting axles ST, wherein the carrier arms 5 in their folded position are substantially parallel to each other and in their unfolded operation position substantially align with each other. A support bracket 7 roughly bent by 90° is arranged, with its legs fixable in advantageous angle position, above the central carrier 4 between the pivotable ends of the carrier arms 5 and extends with its vertical leg slightly distanced from the coupling mechanism 2 upwards.

In an alternative embodiment the consoles can be arranged together with carrier arms also on the central longitudinal axis of the central carrier, i.e. instead of two different, preferably parallel carrier arm pivoting axles only one carrier arm pivoting axis is provided, around which both carrier arms are pivotable.

Figure 1:
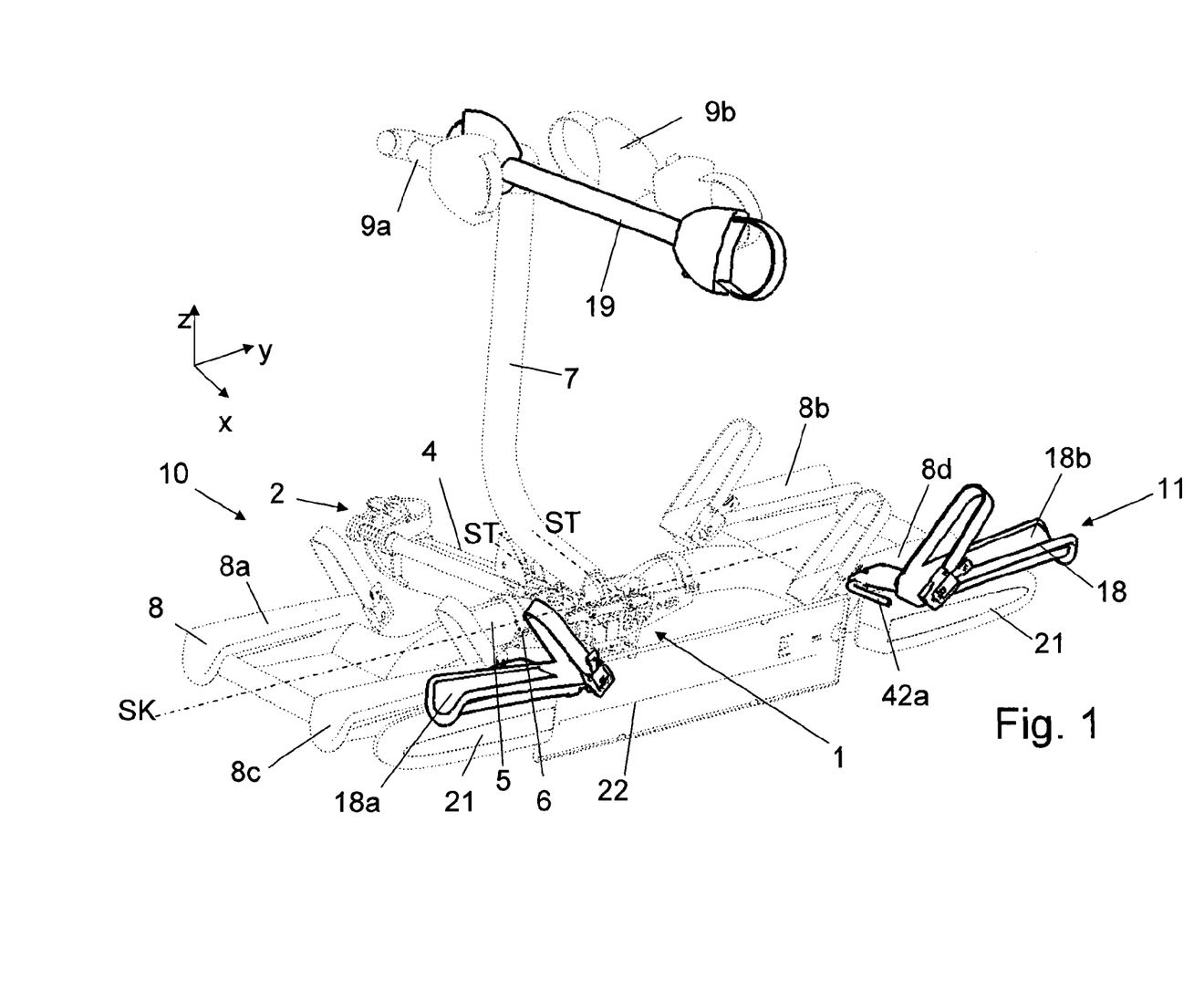
FIG. 1 a perspective view of a bicycle carrier with extension set in operating position according to the embodiment, FIG. 2 a view corresponding to FIG. 1 in an intermediate step of folding or in case of use of the bicycle carrier for two bicycles, FIG. 3a a view corresponding to FIG. 1 in the folded state, FIG. 3b another perspective view of the bicycle carrier of FIG. 3a, FIG. 4 a top view on the bicycle carrier of FIG. 1, FIG. 5a a section along line A-A of FIG. 4, FIG. 5b a view corresponding to FIG. 5a in an intermediate step of the folding, FIG. 5c a view corresponding to FIG. 5a in the folded state, FIG. 6 a rear view of the bicycle carrier of FIG. 1, FIG. 7a a view corresponding to FIG. 6 in an intermediate step of the folding, FIG. 7b a view corresponding to FIG. 6 in the folded state, FIG. 7c a side view of the bicycle carrier of FIG. 1 from the left in the folded state, FIG. 8a a perspective view of a bicycle carrier with an alternative extension set, FIG. 8b a top view on the bicycle carrier with extension set of FIG. 8a, FIG. 8c a rear view of the bicycle carrier with extension set of FIG. 8a, FIG. 8d a perspective view of a bicycle carrier with an alternative extension set in an intermediate step of the folding or in case of use of the bicycle carrier for two bicycles, FIG. 8e a top view on the bicycle carrier with extension set of FIG. 8d, FIG. 9a a perspective view of a bicycle carrier with extension set of FIG. 8a in folded state, FIG. 9b another perspective view of the bicycle carrier with extension set of FIG. 9a, FIG. 9c a side view of the bicycle carrier with extension set of FIG. 9a, FIG. 10a a representation corresponding to FIG. 5a with alternative fixing of the arm carrying the positioning area of the extension set, FIG. 10b an intermediate position, and FIG. 10c the pivoted back and fixed position of the arm carrying the positioning area of the extension set.

When with the unfolded bicycle carrier 1 for example two bicycles are to be transported, they stand parallelly to each other, oriented in y direction, with their wheels on accordingly formed positioning areas 8 (positioning areas 8a 8b, 8b, 8c, 8d) at the carrier arms 5 and are connected in the upper area by means of holders 9 (holders 9a, 9b) with the support bracket 7 in a manner known per se. The carrier arms 5 are formed in such a way that they are arranged rotatably around their longitudinal axis in the respective console 6 and are connected with the support bracket by joints, so that the positioning areas 8 formed bifurcated on it for the load to be transported for the accessibility to the boot of the vehicle can be tilted away from the vehicle together with the support bracket 7 supported in the central carrier 4 (see tilting axis SK in FIG. 1). In a preferred embodiment by a detaching connection between carrier arm 5 and support bracket 7 the carrier arms 5 if not used can also be oriented in a space saving way. In case of use the carrier arms 5 however are form-fit connected with the support bracket 7 and supported in their consoles 6. Alternatively the carrier arms can also be arranged rigidly in the consoles or where applicable also be formed one-piece with them. Because of its function the totality of console 6 and carrier arm 5 as well as the positioning area 8 are also referred to as lever 10. For actuating a corresponding, not represented handle area can be formed at all areas or rigidly be connected to it.

The carrier arm 5 arranged here on the left in travel direction of the vehicle is at the same time the actuating element for the coupling mechanism 2, while the second carrier arm 5 here has no additional function connected to the coupling mechanism 2. As a matter of principle however the tightening with the head of the trailer hitch can also take place independently of the actuation of the carrier arms, or the tightening can, as described in DE 10 2010 036 898 A1 and DE 699 05 676 T2, take place actuating both carrier arms.

In order to transport with the bicycle carrier 1, as it for example is disclosed in DE 10 2011 108 659 A1, a third bicycle, at the bicycle carrier 1 an extension set 11 is detachably applied. This extension set 11 has as substantial components two positioning areas 18 (first positioning area 18a, second positioning area 18b) on which, corresponding to the positioning areas 8 of the bicycle carrier 1, the wheels of the third bicycle (not shown) can be placed and fixed. The first positioning area 18a and thus the first part of the extension set 11 is assigned in this case to that part of the bicycle carrier 1 which presents the positioning areas 8a and 8c, the second positioning area 18b and thus the second part of the extension set 1 in this case is assigned to that part of the bicycle carrier 1 which presents the positioning areas 8b and 8d. Moreover a third person holder 19 is provided for fastening the third bicycle at the support bracket 7. The holder 19 is however not necessarily provided, since its function can be assumed by other elements, like for example load straps, so that it is not part of the extension set according to the invention 11.

The positioning areas 18a and 18b of the extension set 11 are detachably applied laterally of the positioning areas 8c and 8d, for which purpose the carrier arms 5 are formed accordingly in the transition area between the positioning area 8c or 8d and the respective taillight 21. In this case the first positioning area 18a of the extension set 11 is arranged above the left taillight 21 provided on the bicycle carrier 1, the second positioning area 18b accordingly above the second taillight 21 (see FIG. 1). This arrangement of the positioning areas 18 entails a slightly staggered and elevated arrangement of the third bicycle as to the first two bicycles, which are placed straight and oriented in one plane on the bicycle carrier 1.

Figure 5A:
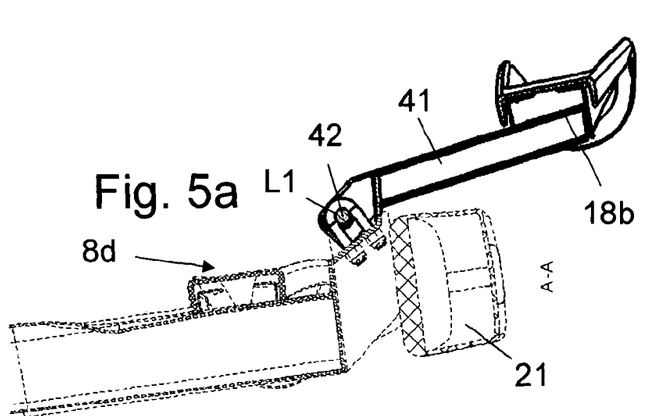

In the following with reference to the FIGS. 5a-5c the pivoting of the positioning areas 18 into the intermediate position by means of the positioning area 18b is described in more detail. The pivoting of the positioning area 18a is done accordingly, so that no further reference is made thereto.

In the following we start from the ready-to-use starting position, i.e. the bicycle carrier 1 together with extension set 11 is situated in its unfolded ready for operation position for three bicycles. The positioning area 18b in this pivoted back operative condition is arranged above the taillight 21, protruding slightly backwards, in this case roughly by the width of the slightly groove-formed wheel support. The wheel support is arranged at a free end of an arm 41, which extends from the taillight side end of the bicycle carrier 1 onwards and with its other end is detachably and especially pivotably supported at the bicycle carrier 1, in this case around a bolt 42 with off-centre bearings for bearing the bolt 42 at the bicycle carrier 1 (first bearing place L1, see FIG. 5a-5c) and for bearing the bolt 42 at the arm 41 of the corresponding part of the extension set 11 (second bearing place L2, see FIG. 4), which makes possible a simple detachment and tensioning in the final positions (FIGS. 5a and 5c). The first bearing place L1 bolt-bicycle carrier is arranged centrally between the second two-piece bearing place L2 bolt-arm (see FIG. 4), the second bearing place L2 being formed in this case by oblong holes.

For the actuation, i.e. detachment and tensioning, the bolt 42 has a lever arm 42a curved by 90° (see FIG. 1, FIG. 2), which in tensioned position in this case shows about in X direction. For releasing the clamping connection, that is caused by the eccentric arrangement of the bearings L1 and L2, the lever arm is pivoted by ca. 180°, in this case towards the vehicle, and for tensioning again accordingly pivoted back.

The bolt 42 forms a blocking element, which is supported on the one hand in a first bearing formed by an U-shaped bracket, which in connection with the corresponding supported area of the bolt 41 forms said first bearing place L1 (bolt-bicycle carrier). This U shaped bracket moreover serves as fixing means for removably attaching the bolt 41 together with the part of the extension set 11 comprising the positioning area 18b at the bicycle carrier 1. For this purpose the ends of the U-shaped bracket are provided with threads, introduced through corresponding openings especially bored holes, that are provided in the bicycle carrier 1 in the transition area towards the taillight 21, and fixed by means of screwed nuts. Additional securing elements, like locknuts, spring washers or similar, can be provided for securing the screwed connections. The bolt 41 is arranged distanced from the bicycle carrier 1, in which the distance is determined by the geometry of the arm 42 and of the transition area of the bicycle carrier 1, at which the part of the extension set 11 is applied (see FIG. 5a).

The bolt 42 is moreover in the arm 41 in a second bearing pivoted, in which the second bearing formed on the arm in connection with the corresponding supported area of the bolt 42 forms said second, two-piece bearing place L2 (bolt-arm), that is arranged eccentrically with respect to the first bearing place L1. In tensioned position of the bolt 42 each time the arm 41 in the range of contact surfaces formed at the arm 41 and at the bicycle carrier 1 adheres flatly at the bicycle carrier 1 and is pressed by the bolt 42 against the bicycle carrier 1.

Figure 5B:
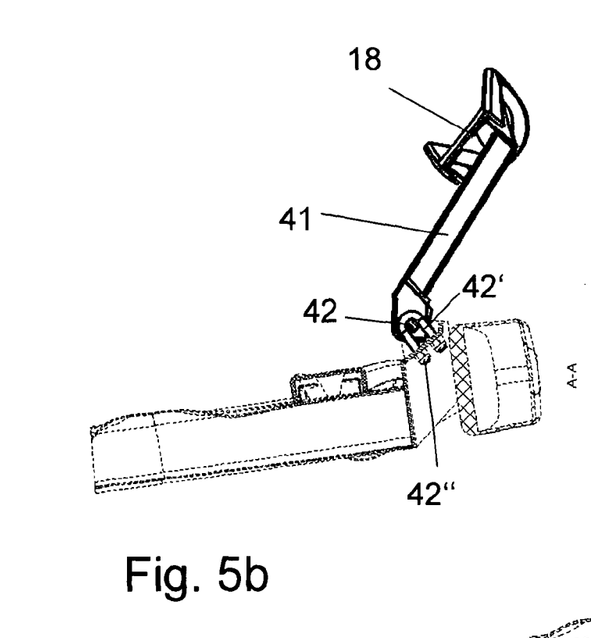

If the bolt 42 is pivoted for releasing the clamping connection, the bearings L2 can move around the double eccentricity of the bolt away from the bicycle carrier 1 and the arm 41 is somewhat more distanced from the bicycle carrier 1, so that the relative position of arm 41 and bicycle carrier 1 is modifies and the contact surfaces arm-bicycle carrier, which in the tensed state adhere one at the other, are slightly distanced, by which the arm 41 is pivotable around the bolt 42 (see FIG. 5b).

Due to the geometry of the arm 41 in connection with the eccentricities of the bolt 42 only in the two final positions of the arm 41 a pivoting back of the bolt 42 is possible so that the lever arm 42a is at the same time an indicating element for the correctly tensed position. For the better optical perception coloured points may be provided, which can be seen by the user only in the correctly tensed state.

Figure 5C:
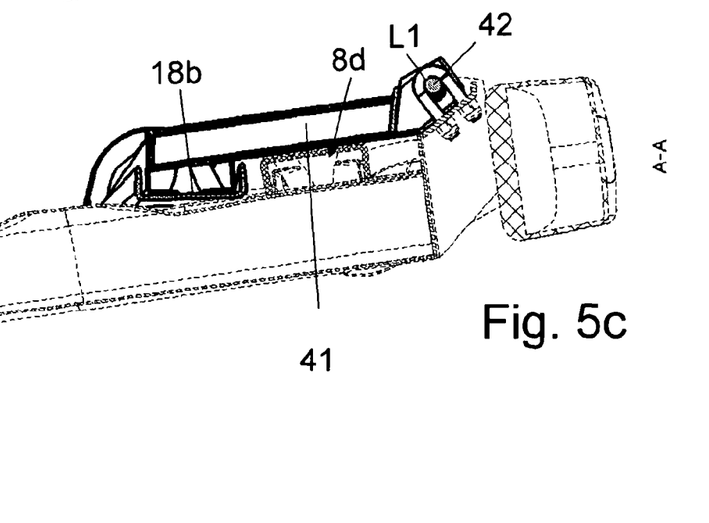
Figure 6:
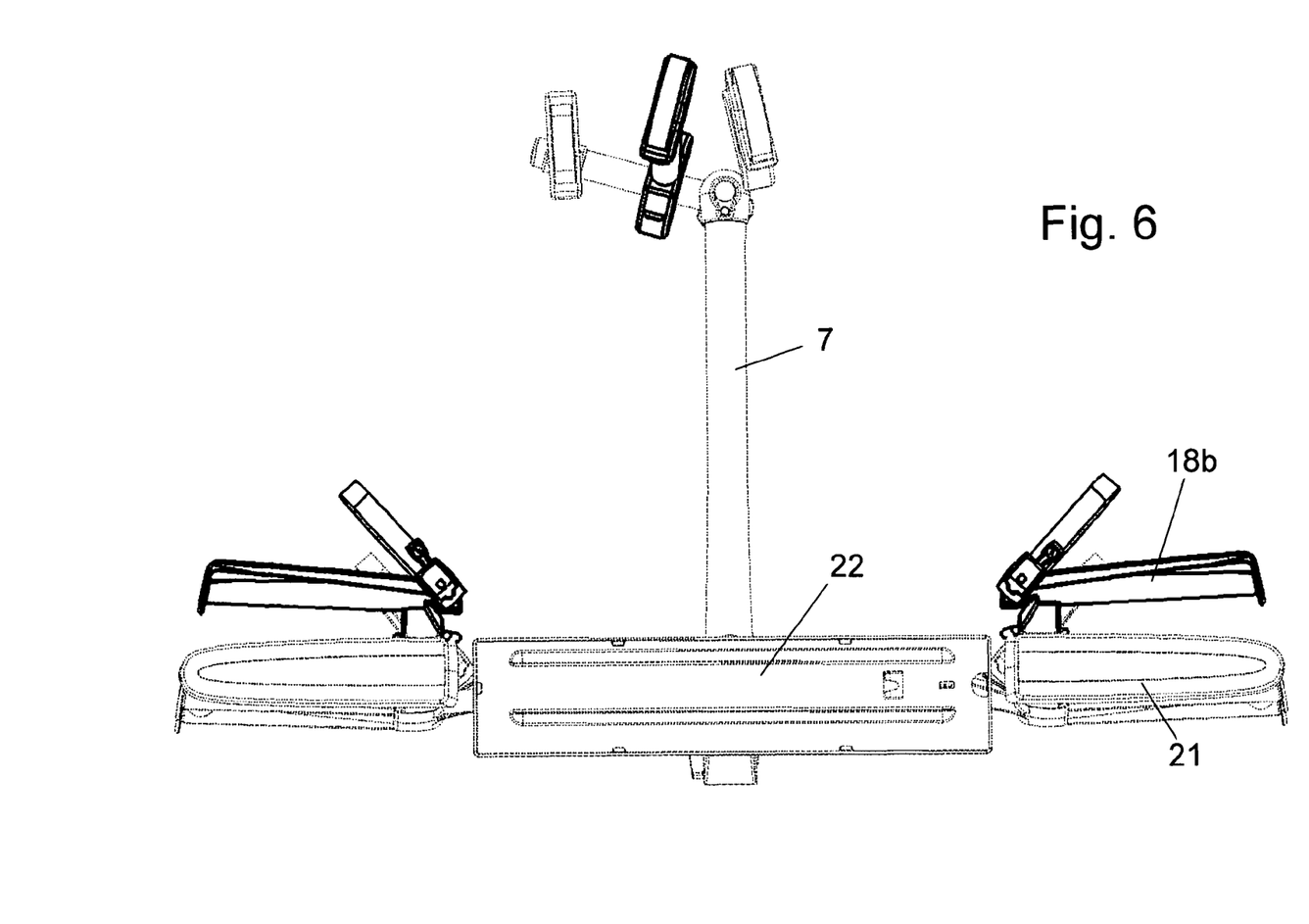

As shown in FIG. 5c, the positioning area 18b in the pivoted back state, thus in the state of the intermediate step before folding the bicycle carrier 1 with extension set 11, is arranged in such a way that the arm 41 extends above the positioning area 8d and the wheel support is placed directly at the coupling side next to the wheel support of the positioning area 8d. In this way the positioning area 18b is arranged between the positioning areas 8b and 8d of the bicycle carrier 1, in which it protrudes insignificantly with its arm 41 upwards. Also in this final position in the tensed state the arm 41 and the bicycle carrier 1 adhere with contact surfaces flatly one at the other, wherein the contact surfaces due to the eccentricity of the bearings L1 and L2 and the corresponding orientation of the bolt 42 are tensed one against the other.

In both tensed final positions the bolt 42 is in the same relative position in the U-shaped bracket, however in a relative position twisted by ca. 180° in the arm 41.

To avoid rattling noises due to small movements of the arm can occur 41 during a ride in principle, is presently contemplated that the tensioned, fully pivoted position of the extension set 11 is applied to the arm 41 of relatively soft plastic. In the tensioned, swung out state in which in use of the extension set 11, higher forces acting on the arm 41 but the arm 41 is at to steel.

Folding the bicycle carrier 1 is continued exactly in the same way as without extension set 11.

Figure 2:
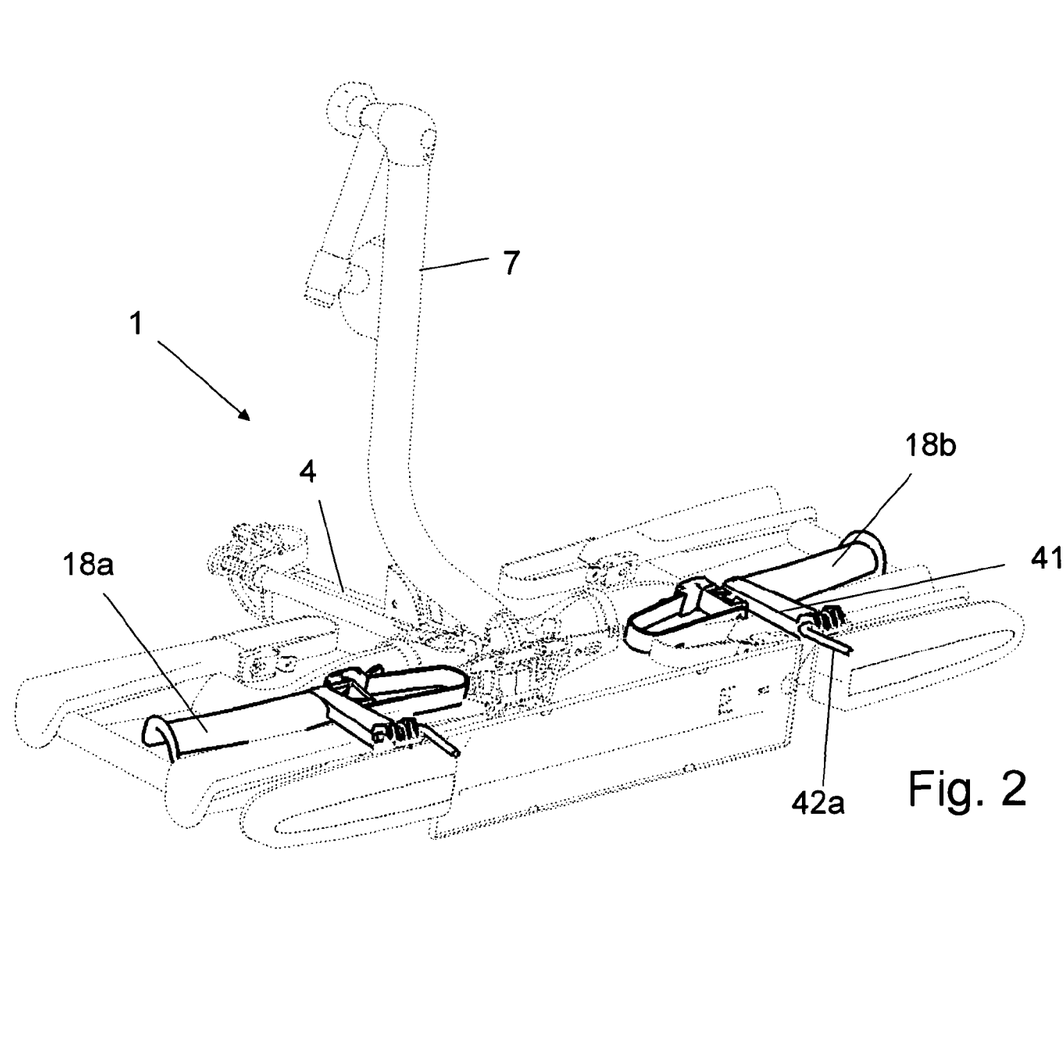
Figure 3A:
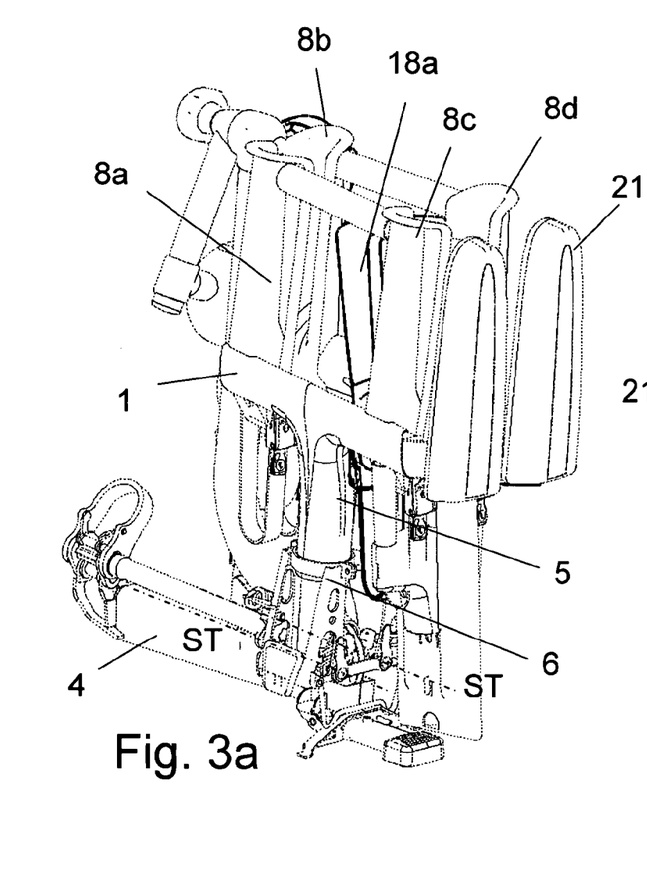
Figure 3B:
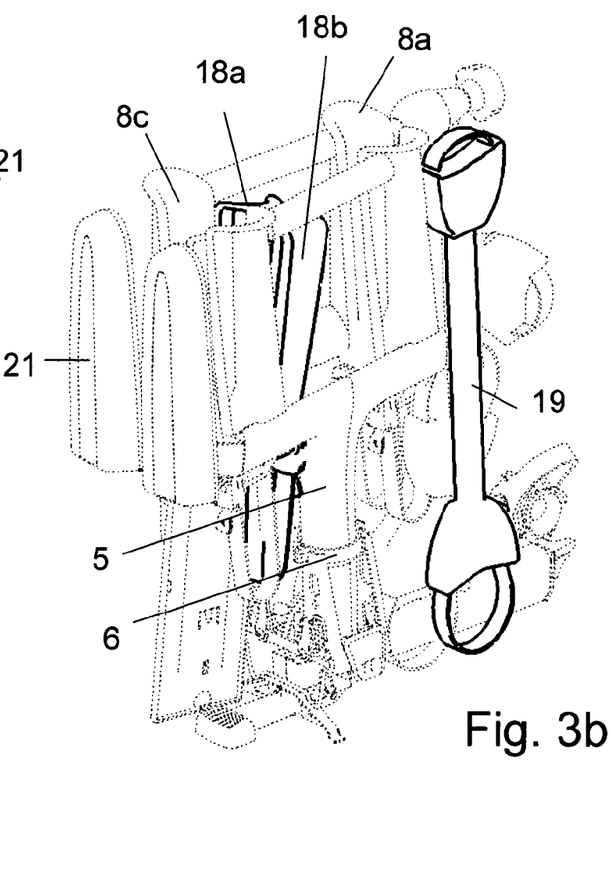
Figure 4:
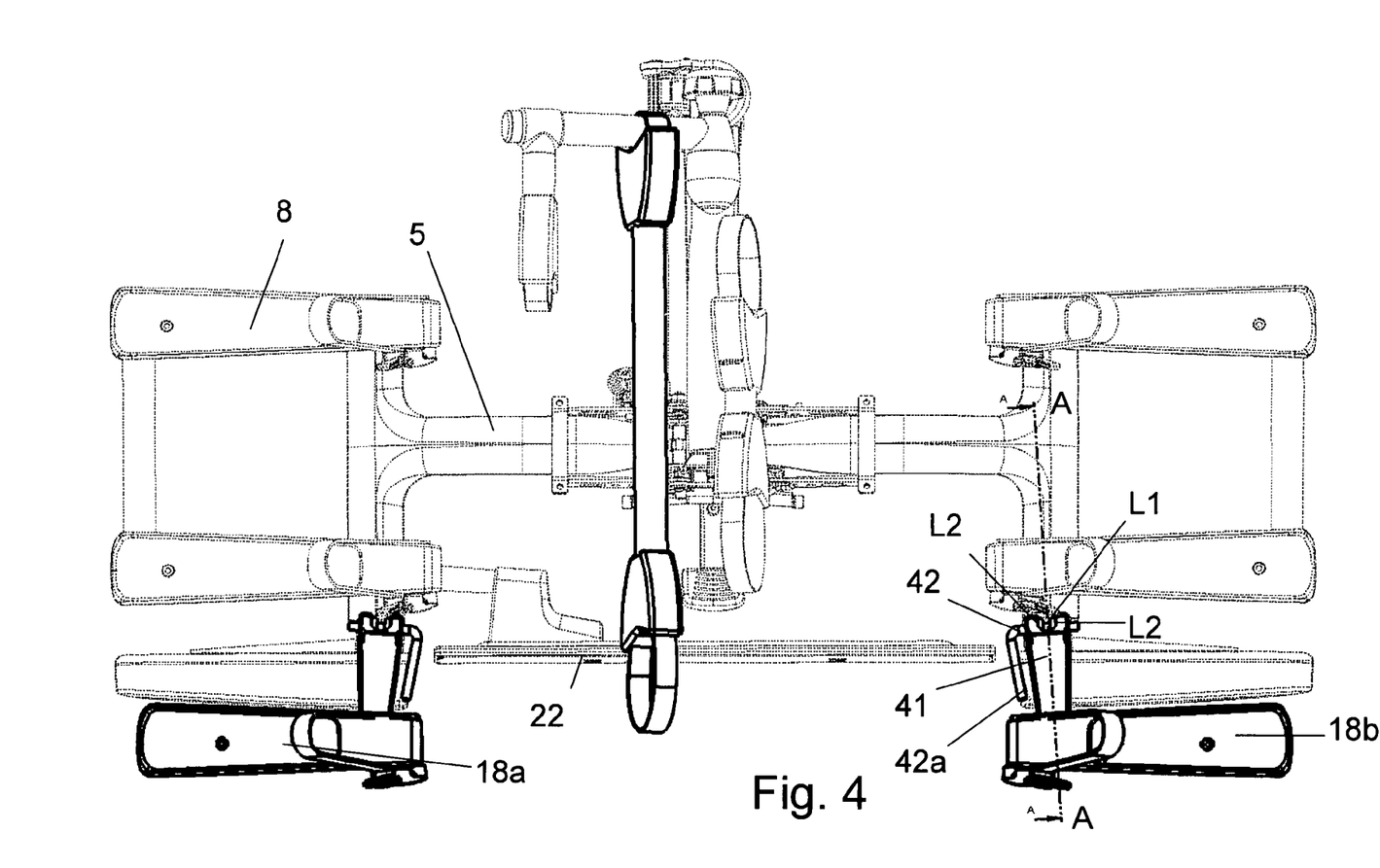

Since, as shown in FIG. 4, the wheel supports of the positioning areas 18 are displaced outwards in relation to the arms 41, the bicycle carrier 1 can also be used with pivoted-in extension set 11, i.e. when only 2 bicycles are to be transported, the extension set 11 neither has to be dismounted nor pivoted out (see FIG. 2).

Figures 7A, 7B, 7C:
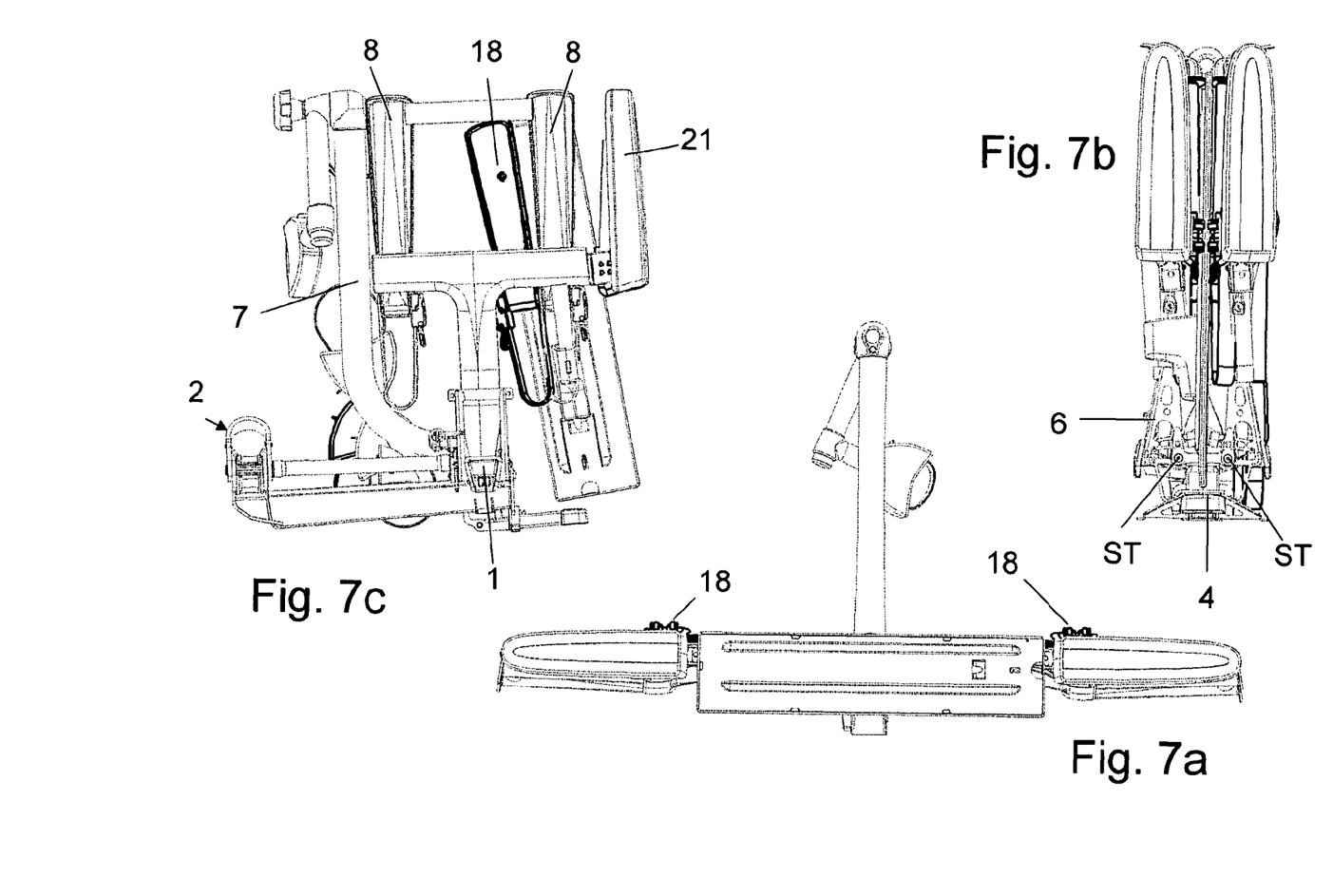

For the sake of completeness it must be pointed out that the number-plate holder 22 in the unfolded state is arranged between the two taillights 21, in which it because of its attachment at one of the two carrier arms 5 of the bicycle carrier 1 in the folded state is turned by ca. 90° and pushed next to the taillight 21. Because of its eccentric attachment at the carrier arm 5 after rotation by 90° and the folding up of the carrier arm 5 it lies with its one end between the outer positioning areas 8c and 8d, the other end is placed in the area of the carrier arm pivoting axles ST (cf. FIG. 7c).

The attachment of the extension set 11 is done appropriately in the state stabilized at the trailer hitch of the bicycle carrier 1. The same applies also for dismounting the extension set 11.

The attachment of the bicycle carrier 1 with extension set 11 at the trailer hitch is done like the attachment of the bicycle carrier 1 without extension set 11. The bicycle carrier 1, together with the extension set 11 applied on it, is put in a stabilized way on the trailer hitch, afterwards first the carrier arm 5 without tensioning function is folded down, then the carrier arm 5 with tensioning function, in which a tensioning clamp is pivoted over the head of the trailer hitch, and by means of tensioning the clamp the bicycle carrier 1 together with the extension set 11 is fixed at the trailer hitch. The swinging-in and tensioning of the clamp is done by a swinging movement of a single lever serving as control element around a pivoting axis, the corresponding carrier arm pivoting axis ST.

Folding the bicycle carrier 1 with extension set 11 according to the example is done like folding the bicycle carrier 1 without extension set 11, in which first the carrier arm 5 is folded upwards, which has no function with regard to fastening at the trailer hitch. By folding up the second carrier arm 5 the tensioning clamp is released and rotated back, so that the bicycle carrier 1 with extension set 11 can be taken off together from the trailer hitch and be stored.

In this case both the arrangement in the unfolded operative condition and in the folded state is mirror-imaged as to the median longitudinal plane, like that of the bicycle carrier 1 with its positioning areas 8. Nevertheless the folded product size of the bicycle carrier 1 without extension set 11 is of the same size as the folded product size (Lmax×Bmax×Hmax) of the bicycle carrier 1 with retracted extension set 11, i.e. the outside dimensions of the folded load carrier 1 without extension set 11 and with extension set 11 are equal.

In the following with reference to FIG. 8a-9c an alternative extension set 11 in connection with the above described bicycle carrier 1 is described in more detail, using the same reference signs for same elements or elements with the same effect. Moreover in the following only differences are described in more detail.

The alternative extension set 11 has unlike the above described extension set 11 two places for bicycles, i.e. with the bicycle carrier 1 together with the alternative extension set 11 altogether four bicycles can be transported. The third bicycle is held with the holder 19 according to the embodiment described before, the fourth bicycle is held by means of an additional holder 19', which is arranged between the third and fourth bicycle.

The pivoting in and out of the arms 41 which carry the positioning areas 18 is done as described before, i.e. the arms 41 both in the pivoted out state, i.e. ready for four bicycles, and in the pivoted in state, i.e. ready for two bicycles, are fixed by means of the abovementioned eccentric bearing of the bolt 42.

Figures 8A, 8B, 8C, 8D, 8E:
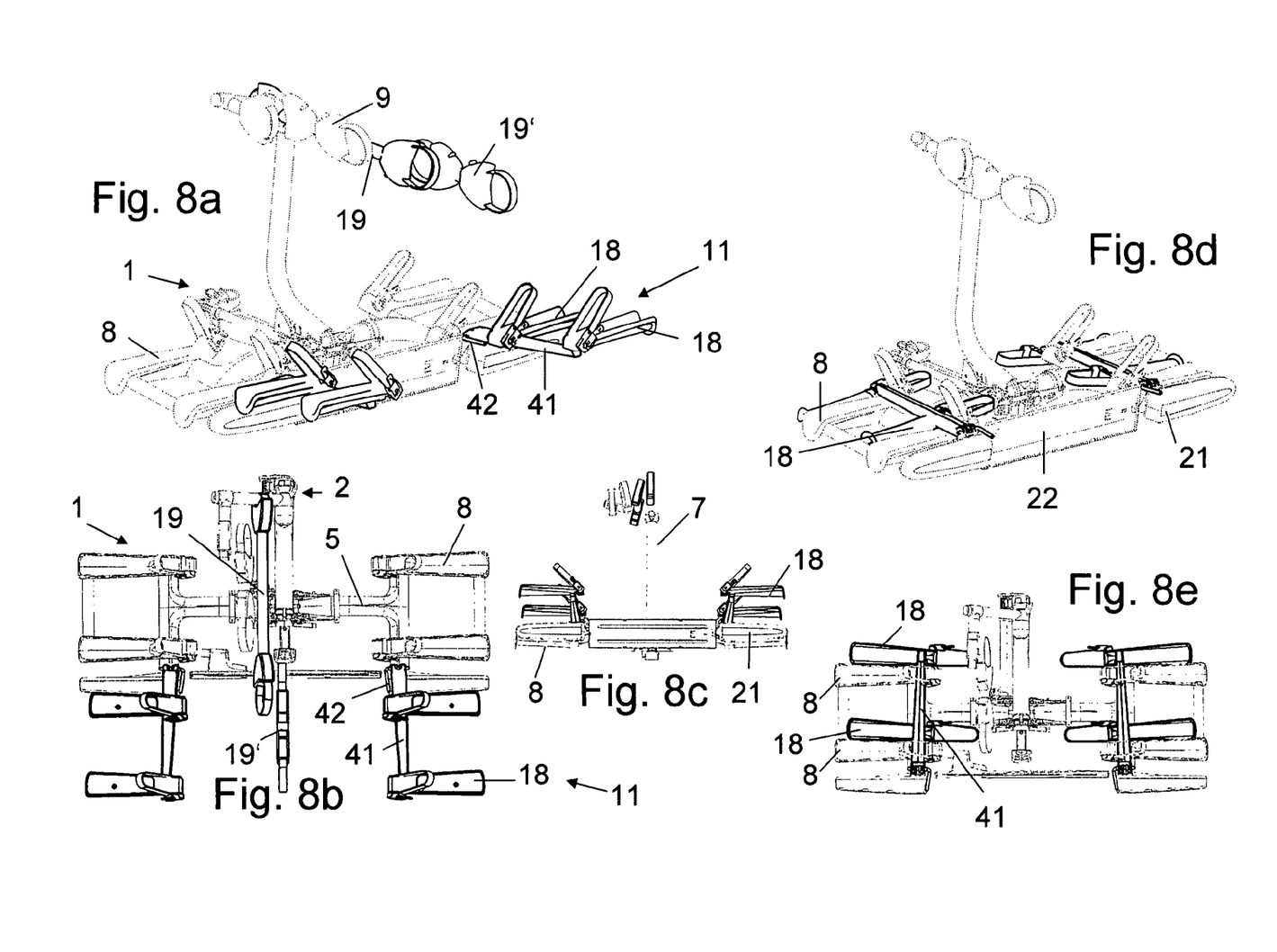
Figures 9A, 9B, 9C:
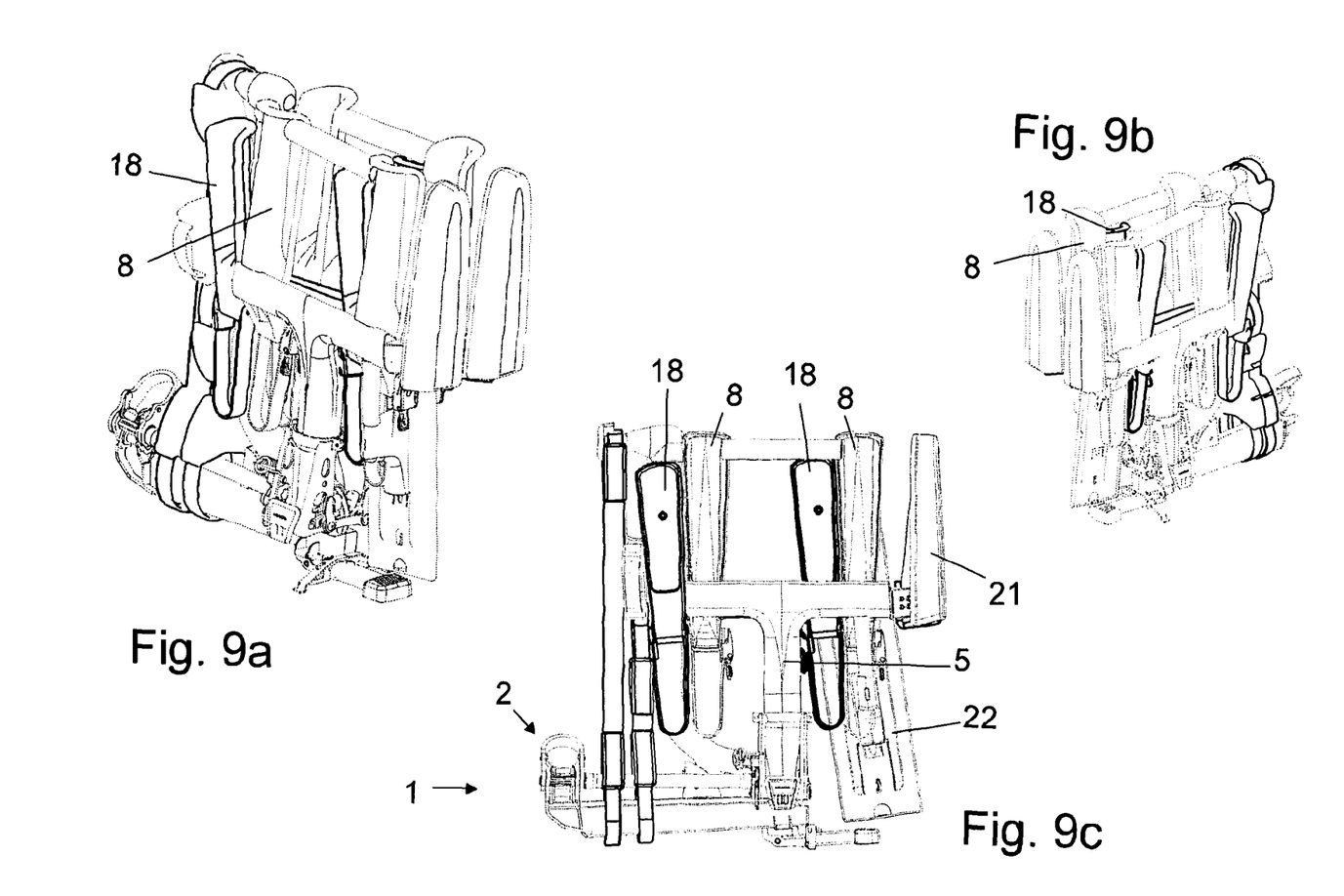

In the pivoted out state the positioning areas 18 of the extension set 11 are slightly elevated (see FIG. 8c). In the pivoted in state of the arms 41 the positioning areas 18 are displaced with respect to the positioning areas 8 (see FIG. 8d, 8e). The positioning areas 18 are arranged for the third bicycle substantially according to the positioning areas 18 of the extension set 11 for an additional bicycle. The positioning areas 18 for the fourth bicycle are arranged on the side of the vehicle displaced with respect to the positioning areas 8 for the first bicycle.

By the offset arrangement of the positioning areas 8, 18 the folded product size of the bicycle carrier 1 with mounted alternative extension set 11 does not increase or increases insignificantly with respect to the bicycle carrier 1 without extension set 11.

Thanks to the possibility of pivoting in of the extension set 11, together with the usability of the bicycle carrier 1 for two bicycles, the projection of the bicycle carrier 1 (together with extension set 11) backwards can be reduced when only two bicycles are to be transported.

Figure 10A:
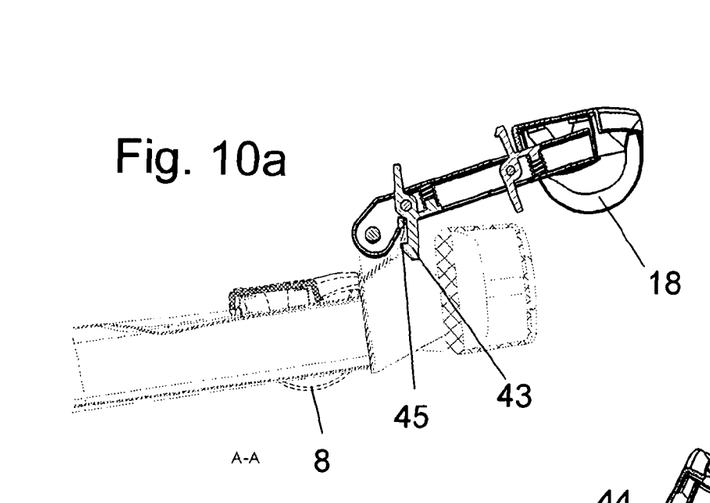
Figure 10B:
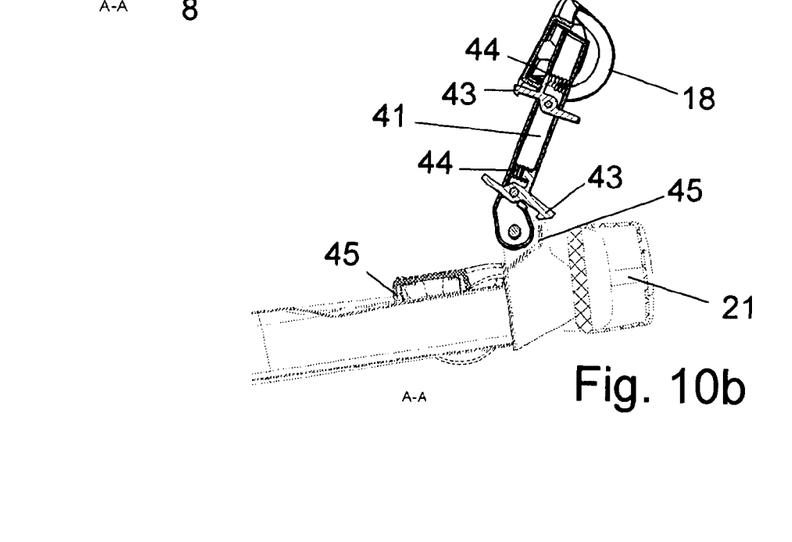
Figure 10C:
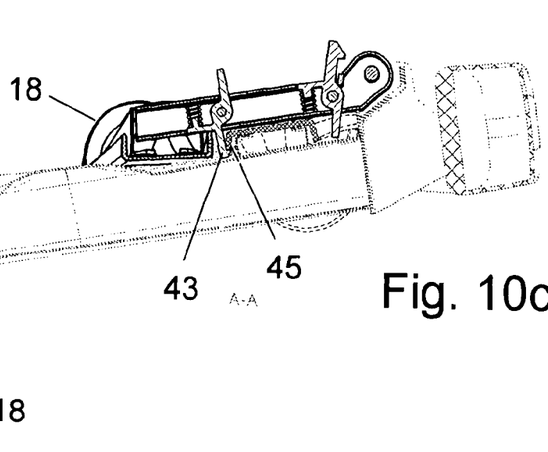

In the following with reference to FIG. 10a-10c an alternative fixing of the arm 41 in the pivoted-in and pivoted-out state is described in more detail, which makes it possible to use the bicycle carrier 1 with extension set 11 (or with alternative extension set 11—not illustrated) in the pivoted-in state (i. e. for 2 bicycles) or in the pivoted-out state (i. e. for 3 or 4 bicycles).

Instead of the off-centre bolt 42, which makes possible tensioning in the two final positions, two detents 43 are provided, which are arranged on the arm 41 pivotably and pretensioned by means of corresponding springs 44. The detents 43 mesh in corresponding catch areas 45 in, which are formed at the bicycle carrier 1. Thus in the pivoted out state of the arm 41 the detent 43 close to the pivoting axis engages into a catch area 45 formed by an opening in the transition area for the taillight 21. In the pivoted-in state of the arm 41 the other detent 43 distant from the pivoting axis engages in the second catch area 45 formed by an edge on the bicycle carrier 1.

Besides the two above described possibilities for fixing the arms 41 at the bicycle carrier 1 also any other fixing possibility in the two final positions is possible, like for example by means of screws introduced through a hole in the arm and screwed in threads on the bicycle carrier, bolts pushed through openings that are co-axial in the final positions.

LIST OF REFERENCE SIGNS

1 Bicycle carrier
2 Coupling mechanism
4 Central carrier
5 Carrier arm
6 Console (for carrier arm)
7 Support bracket
8 Positioning area
8a First positioning area (first bicycle)
8b Second positioning area (first bicycle)
8c First positioning area (second bicycle)
8d Second positioning area (second bicycle)
9 Holder
9a Holder (first bicycle)
9b Holder (second bicycle)
10 Lever
11 Extension set
18 Positioning area
18a First positioning area (third bicycle)
18b Second positioning area (third bicycle)
19 Holder (third bicycle)
19' Additional holder (fourth bicycle)
21 Taillight
22 Number-plate holder
41 Arm
42 Bolt
42a Lever arm
43 Detent
44 Spring
45 Catch area
L1 First bearing place (bolt-bicycle carrier)
L2 Second bearing place (bolt-arm)
SK tilting axis
ST carrier arm pivoting axis

The invention claimed is:

1. A foldable bicycle carrier mountable on a vehicle for transporting of one or more bicycles, said foldable bicycle carrier comprising:

a bicycle carrier having a plurality of positioning areas each configured to retain at least one wheel of a first bicycle, said positioning areas are pivotable around at least one pivoting axis, said first bicycle carrier is foldable to a folded state having a first folded size; and an extension set having at least one first extension set positioning area detachably applied to said bicycle carrier and configured to retain at least one wheel of a second bicycle, and at least one second extension set position area detachably applied to said bicycle carrier and configured to retain at least one additional wheel of said second bicycle, said second extension set positioning area being separated from said first extension set positioning area, said first and second extension set positioning areas are detachably applied at a collapsible area of said bicycle carrier and are pivotable forwards and backwards in direction of said positioning areas of said bicycle carrier, respectively;

wherein said bicycle carrier and said extension set are configured to be folded down from said folded state to an unfolded state having a second folded size;

wherein said first and second extension set positioning areas are each pivotable in and out, in which said bicycle carrier is usable in a pivoted in state and in a pivoted out state, and said first and second extension set positioning areas are each fixed in said pivoted in state and in said pivoted out state, respectively;

wherein said first and second extension set positioning areas each has a pivotable bearing presenting a first bearing place and a second bearing place, an element is pivotably supported in both said first and second bearing place depending on a relative position and is configured to tension a corresponding part of said extension set with said bicycle carrier in said pivoted in state, tension said corresponding part of said extension set with said bicycle carrier in said pivoted out state as well as pivoting said corresponding part of said extension set with respect to said bicycle carrier, said first and second bearing place being off-center towards each other.

2. The foldable bicycle carrier according to claim 1, wherein said element is a bolt with said first and second bearing place arranged off-center in relation to a longitudinal axis of said bolt, wherein said first bearing place presents a first bearing formed at said bicycle carrier and a supported area formed at said bolt, and said second bearing place presents a second bearing formed at a part of said extension set and a supported area formed at said bolt.

3. The foldable bicycle carrier according to claim 2, wherein said first bearing is formed by a U-shaped bracket.

4. The foldable bicycle carrier according to claim 2, wherein said second bearing is two-piece and is arranged on either side adjacent to said first bearing.

5. The foldable bicycle carrier according to claim 2, wherein said relative position of said element in said first bearing in a pivoted forwards tensed position and in a pivoted back tensed positions is equal.

6. The foldable bicycle carrier according to claim 1, wherein said first and second extension set positioning area in an intermediate step for folding said bicycle carrier together with said extension set are positioned between at least two positioning areas of said bicycle carrier.

7. The foldable bicycle carrier according to claim 1, wherein said first and second extension set positioning area in an intermediate step for folding said bicycle carrier together with said extension set is pivoted forwards, wherein said first and second extension set positioning area are displaced with respect to said positioning areas of said bicycle carrier, and said bicycle carrier arranged according to said intermediate step for folding without disassembly of said extension set.

8. The foldable bicycle carrier according to claim 1, wherein said second folded size of said bicycle carrier with mounted said extension set is of the same size as said first folded size of said bicycle carrier without said extension set.

9. The foldable bicycle carrier according to claim 1, wherein said first and second bearing place for pivotably bearing said extension set in said unfolded state of said bicycle carrier is arranged behind and above said positioning areas.

10. The foldable bicycle carrier according to claim 1, wherein said first and second extension set positioning area are detachably applied laterally of said positioning areas, respectively.

11. The foldable bicycle carrier according to claim 2, wherein said first and second extension set positioning area are each arranged at a first end an arm with said second bearing place arranged at a second end of said arm, respectively.

12. The foldable bicycle carrier according to claim 11, wherein said second bearing place is a two-piece second bearing place with each piece defining an oblong hole, said oblong hole of each of said two-piece second bearing place is configured to receive said bolt therethrough.

13. The foldable bicycle carrier according to claim 1, wherein said bicycle carrier further comprises a central carrier member, at least two carrier arms coupled to said central carrier member eccentrically with respect to a central longitudinal axis of said central carrier, and a support bracket extending from said central carrier member between pivotable ends of said at least two carrier arms, said at least two carrier arms are each pivotable around said pivoting axis.

14. The foldable bicycle carrier according to claim 13 further comprises a holder removably attachable to said support bracket and is configured to fasten the second bicycle to said support bracket.

\* \* \* \* \*